United States Patent
Jeon et al.

(10) Patent No.: US 11,825,214 B2
(45) Date of Patent: Nov. 21, 2023

(54) CAMERA DEVICE AND IMAGE GENERATION METHOD OF CAMERA DEVICE

(71) Applicant: LG INNOTEK CO., LTD., Seoul (KR)

(72) Inventors: Se Mi Jeon, Seoul (KR); Jung Ah Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 28 days.

(21) Appl. No.: 17/617,872

(22) PCT Filed: Jun. 15, 2020

(86) PCT No.: PCT/KR2020/007737
§ 371 (c)(1),
(2) Date: Aug. 23, 2022

(87) PCT Pub. No.: WO2020/251336
PCT Pub. Date: Dec. 17, 2020

(65) Prior Publication Data
US 2022/0417428 A1 Dec. 29, 2022

(30) Foreign Application Priority Data
Jun. 13, 2019 (KR) ........................ 10-2019-0070325

(51) Int. Cl.
*H04N 23/951* (2023.01)
*H04N 23/69* (2023.01)
(Continued)

(52) U.S. Cl.
CPC .......... *H04N 23/951* (2023.01); *H04N 5/265* (2013.01); *H04N 5/2628* (2013.01); *H04N 5/272* (2013.01); *H04N 23/62* (2023.01); *H04N 23/69* (2023.01)

(58) Field of Classification Search
CPC .... H04N 23/951; H04N 5/2628; H04N 5/265; H04N 5/272; H04N 23/62; H04N 23/69;
(Continued)

(56) References Cited

U.S. PATENT DOCUMENTS 6,075,926 A * 6/2000 Atkins ................ G06T 3/4007
382/300
2011/0211732 A1* 9/2011 Rapaport ............. G06F 3/1454
382/173

(Continued)

FOREIGN PATENT DOCUMENTS

CN 103098089 A 5/2013
CN 109147036 A 1/2019
(Continued)

*Primary Examiner* — Chiawei Chen
(74) *Attorney, Agent, or Firm* — Birch, Stewart, Kolasch & Birch, LLP

(57) ABSTRACT

A camera device according to an embodiment may include: an image sensor which generates first Bayer data having a first resolution; and a processor which performs deep learning on the basis of the first Bayer data to output second Bayer data having a second resolution higher than the first resolution.

18 Claims, 8 Drawing Sheets
(1 of 8 Drawing Sheet(s) Filed in Color)

(51) Int. Cl.
*H04N 23/62* (2023.01)
*H04N 5/262* (2006.01)
*H04N 5/265* (2006.01)
*H04N 5/272* (2006.01)

(58) Field of Classification Search
CPC .... H04N 23/80; H04N 23/815; H04N 23/843; H04N 23/50; H04N 23/54; H04N 23/55; H04N 23/67; G06N 3/08
See application file for complete search history.

(56) References Cited

U.S. PATENT DOCUMENTS

| | | | | |
|---|---|---|---|---|
| 2013/0156345 | A1* | 6/2013 | Shmunk | H04N 25/48 382/299 |
| 2013/0265311 | A1* | 10/2013 | Na | G06T 3/40 345/428 |
| 2014/0232907 | A1* | 8/2014 | Endo | G02B 7/12 348/240.1 |
| 2016/0093023 | A1* | 3/2016 | Prasad | G06T 3/4053 382/173 |
| 2017/0024856 | A1* | 1/2017 | Kajimura | H04N 23/951 |
| 2017/0318222 | A1* | 11/2017 | Mantzel | H04N 23/841 |
| 2019/0005619 | A1* | 1/2019 | Michelini | G06N 3/045 |
| 2019/0045168 | A1* | 2/2019 | Chaudhuri | H04N 13/139 |
| 2019/0350533 | A1* | 11/2019 | Takeda | G06T 3/4053 |
| 2020/0311890 | A1* | 10/2020 | Smirnov | H04N 23/741 |
| 2020/0334789 | A1* | 10/2020 | Zhang | G06T 3/4053 |
| 2021/0097645 | A1* | 4/2021 | Navarrete Michelini | G06T 3/4053 |
| 2022/0114703 | A1* | 4/2022 | Kang | H04N 5/2621 |

FOREIGN PATENT DOCUMENTS

| | | |
|---|---|---|
| JP | 2015-204599 A | 11/2015 |
| KR | 2003-0020357 A | 3/2003 |
| KR | 10-2013-0102550 A | 9/2013 |
| KR | 10-2013-0112574 A | 10/2013 |
| KR | 10-2017-0028591 A | 3/2017 |
| KR | 10-2019-0009588 A | 1/2019 |
| KR | 10-2019-0021756 A | 3/2019 |
| KR | 10-2019-0037842 A | 4/2019 |
| WO | WO 01/20549 A1 | 3/2001 |

* cited by examiner (1) First image (1X)
(2) Second image (4X)
(3) Upscaled first image (2X)
(4) Downscaled second image (2X)
Synthesize
(5) Third image (2X)

CAMERA DEVICE AND IMAGE GENERATION METHOD OF CAMERA DEVICE

CROSS REFERENCE TO RELATED APPLICATIONS

This application is the National Phase of PCT International Application No. PCT/KR2020/007737, filed on Jun. 15, 2020, which claims priority under 35 U.S.C. 119(a) to Patent Application No. 10-2019-0070325, filed in the Republic of Korea on Jun. 13, 2019, all of which are hereby expressly incorporated by reference into the present application.

TECHNICAL FIELD

The present invention relates to a camera device and an image generation method of the camera device, and more particularly, to a technology for generating images at various magnifications based on a high-resolution image using a deep learning algorithm.

BACKGROUND ART

As technology advances and miniaturization of camera devices becomes possible, small camera devices are being applied to and used in various IT devices such as smartphones, mobile phones, PDAs, and the like. The camera device is manufactured using an image sensor such as CCD or CMOS as a main component, and is manufactured to enable focus adjustment in order to adjust the size of an image.

Such a camera device is configured to include a plurality of lenses and an actuator, and an object with respect to the subject can be photographed in a manner in which an optical focal length is adjusted when the actuator moves each lens to change the relative distance.

Specifically, the camera device includes an image sensor that converts an optical signal received from the outside into an electrical signal, a lens that focuses light onto the image sensor, an infrared (IR) filter, a housing including them, and a printed circuit board that processes the image sensor signal, and the like, and the actuator adjusts the focal length of the lens by an actuator such as a voice coil motor (VCM) actuator or a micro electromechanical systems (MEMS) actuator.

Meanwhile, as technology advances and enables the realization of high-resolution images, the demand for technologies capable of realizing high-resolution images of distant objects is also increasing.

In general, cameras are equipped with a zoom function to take pictures of distant objects. the zoom function is largely divided into an optical zoom in which the actual lens inside the camera moves to magnify the subject and a digital zoom method in which zoom effect is achieved by enlarging a portion of an image data of the photographed subject using a digital processing method.

In the case of optical zoom, which obtains an image of a subject by using a lens movement, an image having a relatively high resolution can be obtained, but there is a problem in that the internal structure of the camera is complicated and the cost increases due to the addition of parts. In addition, there is a limit to an area in which a subject can be enlarged by using an optical zoom, and for this part, a technology for correcting with software is being developed.

In addition to these methods, technologies exist to implement high-resolution images by generating more pixel information by moving parts inside the camera, such as a sensor shift technology that shakes the sensor with voice coil motor (VCM) or micro-electro mechanical systems (MEMS) technology, an optical image stabilizer (OIS) technology that obtains pixel information by shaking the lens with VCM and the like, and a technology that shakes the filter between the sensor and the lens, and the like.

However, the disadvantage of these technologies is that, when photographing a moving object, phenomena such as motion blur or artifacts may occur because they synthesize data of several parallaxes, which causes the problem of lowering the image quality.

In addition, there are problems in that the size of the camera device increases as a complicated device for implementing this is inserted into the camera, it is difficult to use in a vehicle in which the camera is installed since it is implemented by shaking parts, and it can be used only in a stationary environment.

On the other hand, as a high resolution implementation technology using a software algorithm generally used in TVs, there are technologies such as a single-frame super resolution (SR) or a multi-frame super resolution (SR), and the like.

In the case of these technologies, there is no artifact problem, but it is an algorithm that is difficult to apply to devices to which small camera devices such as mobile, vehicle, IoT, and the like can be applied, and in addition, there is a problem that is difficult to implement unless a separate image processor is mounted in order to implement such a technology.

In addition, in the case of digital zoom, since an image is generated by simply magnifying a portion of a less magnified image, the practical number of pixels are reduced as the magnification increases, leading to deterioration in performance. Accordingly, in order to solve this problem, although the development of zoom using an optical system is being carried out for smartphone cameras, but there is a problem in that the size increases and the price increases due to the addition of parts including the lens.

In addition, in the case of zoom using the optical system of a small camera of the prior art, unlike a conventional digital camera, since the lens is not continuously moved, an image cannot be generated using a lens other than a specifically fixed magnification, so for such a region, a zoom image is generated by processing with software. However, since this is also implemented based on a multi-camera, the price increases, and additional software is required to synthesize a plurality of images photographed by a plurality of cameras into a single image.

However, since software capable of performing such a synthesis algorithm requires large amount of data to be processed there has been a problem in that it is difficult to process in real time even in the latest application processor (AP). Therefore, in a moving picture environment, a general digital zoom had to be used, which inevitably had to acquire an image with a poor resolution.

DETAILED DESCRIPTION OF THE INVENTION

Technical Subject

Accordingly, the present invention is an invention devised to solve the problems of the prior art as described above, and is to provide a camera device and an image generation method of the camera device capable of generating a high resolution image from a low resolution image without causing problems such as motion blur or artifacts and a mobile terminal device including the same.

Specifically, an object is to provide a camera device and an image generation method of the camera device capable of more efficiently generating a high resolution image and a mobile terminal device including the same by mounting a chip, to which a high resolution implementation algorithm based on deep learning technology is applied, on a camera device or a mobile terminal device equipped with a camera device in the form of on the fly.

In addition, an object is to provide a camera device and an image generation method of the camera device capable of providing images for substantially continuous zoom magnification, in the case where an image can only be generated for a specific magnification due to the characteristics of the camera device, by providing images generated using deep learning for the images of magnifications that cannot be generated.

Technical Solution

A camera device according to an embodiment comprises:
an input unit for receiving magnification information on an image from a user; an image sensor for receiving light and generating a first image having a first resolution; a processor for generating a second image having a second resolution higher than the first resolution by performing deep learning based on the first image, wherein the processor may generate a third image corresponding to a magnification being inputted by the user based on the first image and the second image.

The processor may generate the third image by superimposing the second image on the first image enlarged by the magnification being inputted by the user.

The processor may generate a third image having a resolution value between the first resolution and the second resolution.

The processor may generated a third image after up-scaling the first image using the magnification as inputted and down-scaling the second image using the magnification as inputted.

The processor may generate a third image after superimposing the second image to the center of the first image.

The processor may perform correction of the resolution by a preset range based on a boundary region where the first image and the second image are being superimposed with each other.

The processor may perform correction of the resolution by changing a mixing ratio of the first resolution and the second resolution.

The processor may increase the mixing ratio of the first resolution as it enters the inside of the second image based on the boundary region.

The processor may generate the second image according to a preset algorithm to generate an image having a second resolution.

An image generation method of camera device according to another embodiment may include the steps of: receiving magnification information on an image from a user; receiving light using an image sensor and generating a first image having a first resolution; generating a second image having a second resolution higher than the first resolution by performing deep learning based on the first image; and generating a third image that is an image of a magnification being inputted by the user based on the first image and the second image.

The step of generating of the third image may include a step of generating the third image by superimposing the second image on the first image enlarged by the magnification being inputted by the user.

The step of generating the third image may include a step of generating a third image having a resolution value between the first resolution and the second resolution.

The step of generating the third image may include a step of generating a third image after up-scaling the first image using the magnification as inputted and down-scaling the second image using the magnification as inputted.

The step of generating the third image may include a step of generating a third image after superimposing the second image to the center of the first image.

The method may include a step of performing correction of the resolution within a preset range based on a boundary region where the first image and the second image are being superimposed in the generated third image.

The step of performing correction of a resolution may be performed by changing the mixing ratio of the first resolution and the second resolution.

The step of generating the third image may include a step of performing correction of a resolution in a way that the mixing ratio of the first resolution is increased as it enters the inside of the second image based on the boundary region.

Advantageous Effects

In a camera device and an image generation method of the camera device according to an embodiment, since a high-resolution image is implemented by using a processor to which an algorithm capable of generating a high-resolution image is applied, there is an advantage in that a high resolution image can be implemented by using only a few line buffers.

In addition, since high resolution images are generated by optimizing the network configuration, it can be implemented as a small chip with a relatively small size, and since the present technology can be implemented in a way that the chip to which this technology is applied is mounted on a camera device, the continuous zoom function can be used by applying this technology to a camera device that does not have a zoom function or a camera device that only supports a fixed zoom for a specific magnification.

In addition, even in a camera device that only support optically continuous zoom for a specific magnification, images for unsupported magnifications can be generated by applying this technology, so there is an effect in that a practically continuous zoom function in a wider range of magnification can be utilized.

BRIEF DESCRIPTION OF DRAWINGS

The patent or application file contains at least one drawing executed in color. Copies of this patent or patent application publication with color drawing(s) will be provided by the Office upon request and payment of the necessary fee.

BEST MODE

Figure 1:
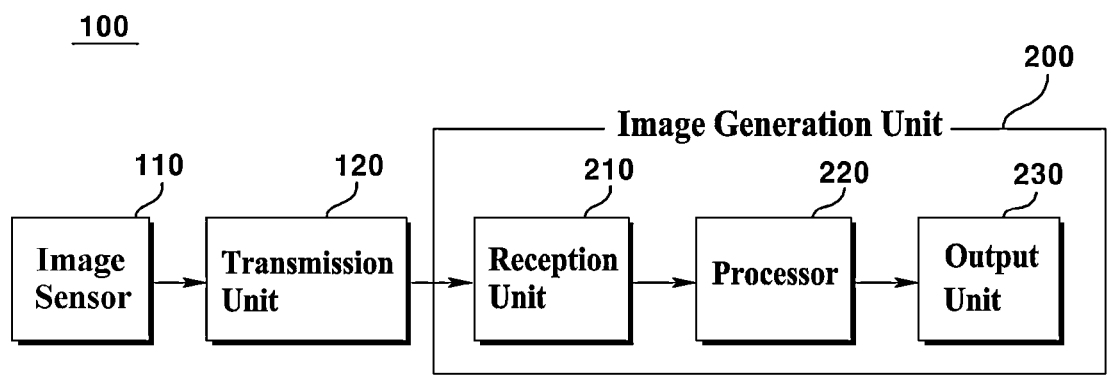
FIG. 1 is a block diagram illustrating some components of a camera device according to an embodiment.

The embodiments described in the present specification and the configurations shown in the drawings are preferred examples of the disclosed invention, and there may be various modifications that may replace the embodiments and drawings of the present specification at the time of filing of the present application.

In addition, terms used in the present specification are used to describe embodiments and are not intended to limit and/or limit the disclosed invention. Singular expressions include plural expressions unless the context clearly indicates otherwise.

In the present specification, terms such as "comprise", "include" or "have" are intended to designate the presence of features, numbers, steps, actions, components, parts, or a combination thereof described in the specification. Or the presence or addition of other features, numbers, steps, actions, components, parts, or combinations thereof, or any other feature, or a number, steps, operations, components, parts, or combinations thereof, and includes ordinal numbers such as "first" and "second" used herein. The terms described above may be used to describe various components, but the components are not limited by the terms.

Hereinafter, embodiments of the present invention will be described in detail with reference to the accompanying drawings so that those of ordinary skill in the art may easily implement the present invention. In addition, in the drawings, parts not related to the description are omitted in order to clearly describe the present invention.

Figure 2:
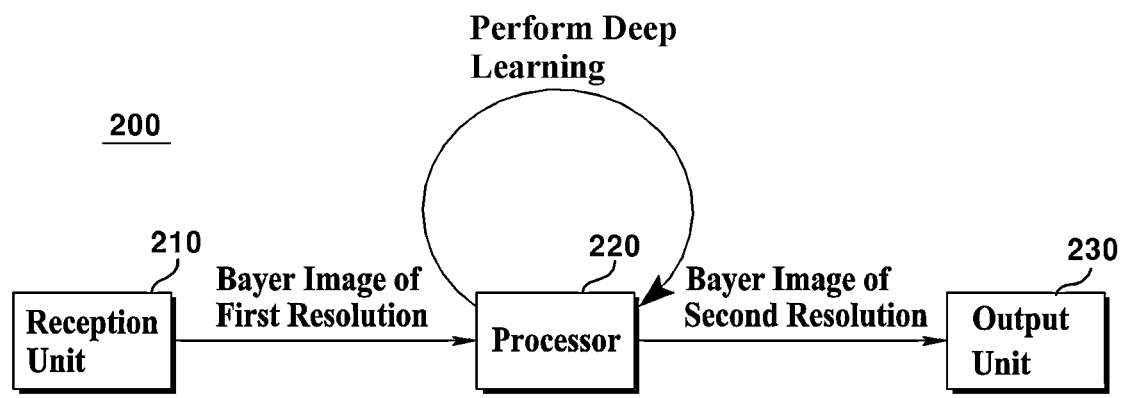
FIG. 2 is a diagram illustrating some components of an image generation unit according to an embodiment.
Figure 3:
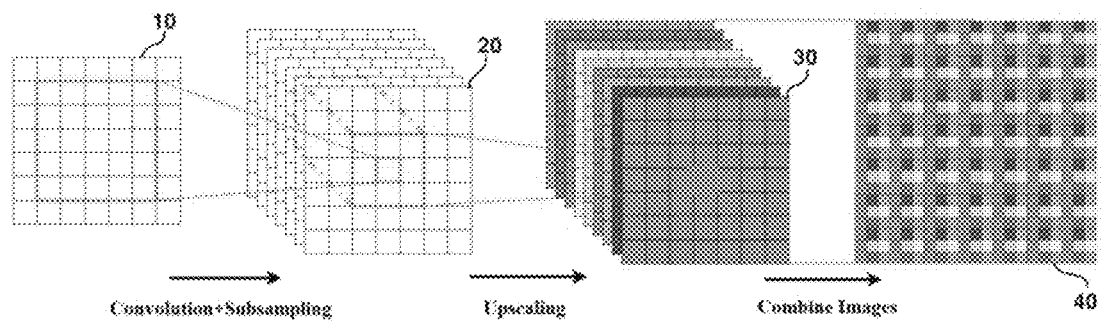
FIG. 3 is a diagram illustrating a process of deep learning training according to an embodiment.

FIG. 1 is a block diagram illustrating some components of a camera device 100 according to an embodiment, FIG. 2 is a diagram illustrating some components of an image generation unit 200 according to an embodiment, and FIG. 3 is a diagram illustrating an example of a deep learning process.

Referring to FIG. 1, a camera device 100 according to an embodiment includes an image sensor 130 for acquiring an image of an external object and a transmission unit 140 for transmitting an image acquired by the image sensor 130 to the image generation unit 200, wherein the image generation unit 200 may include a reception unit 210 that receives the image transmitted by the transmission unit 140 and transmits it to a processor 220, a processor 220 for generating an image having a resolution different from that of the received image by applying an algorithm derived as a result of deep learning training on an image received from the reception unit 210, an output unit 230 that receives the image generated by the processor 220 and transmits it to an external device, and the like. The processor 220 may be a processor being learned using a deep learning-based algorithm.

Specifically, the image sensor 130 may include an image sensor such as a complementary metal oxide semiconductor (CMOS) or a charge coupled device (CCD) that converts light entering through the lens 120 of the camera device into an electrical signal.

The transmission unit 140 may transmit the image acquired by the image sensor 130 to the reception unit 210 of the image generation device 200. In FIG. 1, the transmission unit 140 and the image sensor 130 are illustrated as distinguished components, but are not limited thereto, and the image sensor 130 may simultaneously perform the role of the transmission unit 140 which will be described later.

Specifically, the transmission unit 140 may extract information on a Bayer pattern from an image acquired by the image sensor 130 and then transmit the information to the reception unit 210.

The image generation unit 200 may include a transmission unit 210 that receives an image transmitted by the transmission unit 140 and transmits it to the processor 220, a processor 220 that generates an image having a higher resolution by using an algorithm generated by deep learning training on the image received from the transmission unit 210, an output unit 230 that receives the image generated by the processor 220 and transmits it to the outside, and the like.

Specifically, after receiving a Bayer image having a first resolution from the reception unit 210, the processor 220 generates a Bayer image having a second resolution using an algorithm generated by deep learning training, and then the generated second Bayer image may be transmitted to the output unit 230.

Here, the second resolution means a resolution having a resolution value different from that of a first resolution, and specifically, may mean a resolution higher or lower than the first resolution. A resolution value that a second resolution may have may be freely set and changed by a user according to a user's purpose.

Therefore, although not illustrated in the drawing, a camera device 100 according to an embodiment may further include an input unit for receiving information about the second resolution, and through this, the user may input information about a desired resolution to the camera device 100.

For example, if the user wants to obtain a high resolution image, the second resolution may be set to a resolution having a large difference from the first resolution, and when a new image is desired to be acquired within a relatively short time, the second resolution value may be freely set to a resolution that does not have a large difference from that of the first resolution.

In addition, the processor 220 may be implemented through a memory (not shown) in which at least one program instruction being executed through the processor is stored.

Specifically, the memory may include a volatile memory such as SRAM or DRAM. However, it is not limited thereto, and in some cases, the memory 115 may also include a non-volatile memory such as flash memory, read only memory (ROM), erasable programmable read only memory (EPROM), electronically erasable programmable read only memory (EEPROM), and the like.

A typical camera device receives the Bayer pattern from the image sensor and outputs image data through the process of applying a color (color interpolation, color interpolation, or demosaicing), but the transmission unit 140 according to an embodiment extracts information including Bayer pattern information from the image received from the image sensor 130 and may transmit the extracted information to the outside.

Here, the Bayer pattern may include raw data being outputted by the image sensor 130 that converts an optical signal included in the camera device 100 into an electrical signal.

Specifically, the optical signal transmitted through the lens 120 included in the camera device 100 may be converted into an electrical signal through each pixel disposed in the image sensor capable of detecting colors of R, G, and B.

If the specification of the camera device 100 is 5 million pixels, it can be considered that an image sensor including 5 million pixels capable of detecting colors of R, G, and B is included. Although the number of pixels is 5 million, it can be seen that monochrome pixels that detect only the brightness of black and white rather than actually detecting each color are combined with any one of R, G, and B filters.

That is, in the image sensor, R, G, and B color filters are arranged in a specific pattern on monochromatic pixel cells arranged as many as the number of pixels. Accordingly, the R, G, and B color patterns are disposed intersected with one another according to the user's (i.e., human) visual characteristics, and this is called a Bayer pattern.

In general, the Bayer pattern has a smaller amount of data than image data. Therefore, there is an advantage in that even if the device is equipped with a camera device that does not have a high-end processor, it can transmit and receive Bayer pattern image information relatively faster than image data, and based on this, the Bayer pattern image can be converted into images with various resolutions.

For example, since a camera device is mounted on a vehicle, the camera device does not require many processors to process images even in an environment where the low voltage differential signaling (LVDS) having a full-duplex transmission speed of 100 Mbit/s is used, and thus it is not overloaded so that it may not endanger the driver or the safety of the driver using the vehicle.

In addition, since the size of data transmitted by the in-vehicle communication network can be reduced, even if it is applied to an autonomous vehicle, it is possible to eliminate problems caused by the communication method, communication speed, and the like according to the operation of a plurality of cameras disposed in the vehicle.

In addition, in transmitting the Bayer pattern image information to the reception unit 210, the transmission unit 140 receives frame in Bayer pattern from the image sensor 130 and then can send the information after sampling down to 1/n size.

Specifically, the transmission unit 140 may perform downsampling after smoothing through a Gaussian filter or the like on Bayer pattern data received before downsampling. Thereafter, after generating a frame packet based on the down-sampled image data, the completed frame packet may be transmitted to the reception unit 210. However, these functions may be simultaneously performed by the processor 220 instead of the transmission unit 140.

In addition, the transmission unit 140 may include a serializer (not shown) that converts the Bayer pattern into serial data in order to transmit Bayer pattern information through a serial communication method such as a low voltage differential signaling (LVDS).

Until now, general components of the camera module 100 according to an embodiment have been described. Hereinafter, a method and features of generating an algorithm being applied to the processor 220 will be described.

The algorithm applied to the processor 220 of the camera device 100 according to an embodiment is an algorithm for generating an image having a higher resolution than the resolution of the input image, and may mean an optimal algorithm that is generated by repeatedly performing deep learning training.

Deep learning, also referred to as deep structured learning, refers to a set of algorithms related to machine learning that attempts high-level abstraction (a task that summarizes core contents or functions in large amounts of data or complex data) through a combination of several nonlinear transformation methods.

Specifically, deep learning expresses any learning data in a form that a computer can understand (for example, in the case of an image, pixel information is expressed as a column vector, and the like), and is a learning technique for a lot of research (how to make a better representation technique and how to make a model to learn these) to apply these to learning, and may include learning techniques such as deep neural networks (DNN) and deep belief networks (DBN).

For example, deep learning may first recognize the surrounding environment and transmit the current environment state to the processor. The processor performs an action corresponding to it, and the environment informs the processor of a reward value according to the action again. And the processor takes the action that maximizes the reward value. Through this process, the learning process may be repeated.

As described above, the learning data used while performing deep learning may be a result obtained by converting a Bayer image with a low actual resolution into a Bayer image with a high resolution, or may be information obtained through simulation.

If the simulation process is performed, data can be acquired more quickly by adjusting it according to the environment of the simulation (the background of the image, the type of color, and the like). Hereinafter, a method of generating an algorithm applied to the processor 220 according to an embodiment will be described in detail with reference to FIGS. 3 and 4.

Figure 4:
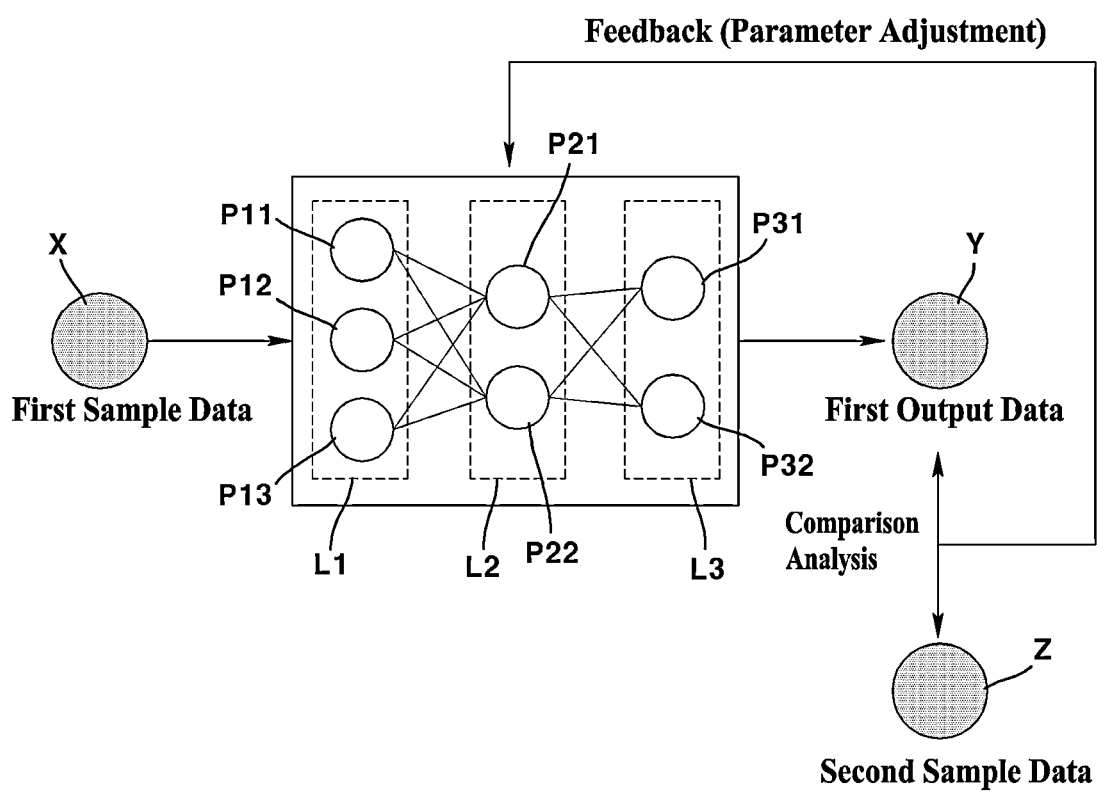
FIG. 4 is a diagram illustrating a process of performing deep running training according to another embodiment.

FIG. 3 is a diagram illustrating a process of deep learning training according to an embodiment, and FIG. 4 is a diagram illustrating a process of performing deep running training according to another embodiment.

The deep learning of FIG. 3 is deep learning to which a deep neural network (DNN) algorithm is applied, and is a diagram illustrating a process of generating an image having a new resolution as the DNN algorithm is applied.

Deep neural networks (DNNs) can be specified as a deep neural network in which multiple hidden layers exist between an input layer and an output layer, a convolutional neural network that forms a pattern of connections between neurons, similar to the structure of the visual cortex of animals, and a recurrent neural network that builds up a neural network at every moment over time.

Specifically, DNN classifies neural networks by repeating convolution and sub-sampling to reduce the amount of data and distort. In other words, DNN outputs classification results through feature extraction and classification, and is mainly used for image analysis, and convolution means image filtering.

If describing the process being performed by the processor 220 to which the DNN algorithm is applied with reference to FIG. 3, the processor 220 performs convolution and sub-sampling for the region whose magnification is desired to be increased based on the Bayer image 10 having a first resolution received from the reception unit 210.

Increasing the magnification means enlarging only a specific part of the image acquired by the image sensor 110. Accordingly, since the portion not selected by the user is a portion that the user is not interested in, there is no need to perform a process of increasing the resolution, so that only the portion selected by the user may be subjected to the convolution and subsampling process.

Subsampling refers to a process of reducing the size of an image. As an example, sub-sampling may use a Max-pool method and the like. Max-pull is a technique that selects the maximum value in a given region, similar to how neurons respond to the largest signal. Subsampling has advantages of reducing noise and increasing learning speed.

When convolution and subsampling are performed, a plurality of images 20 may be outputted as illustrated in FIG. 3. Thereafter, a plurality of images having different features may be outputted using an up-scale method based on the outputted images. The up-scaling method means scaling an image by r*r times using r^2 different filters.

When a plurality of images are being outputted as illustrated in FIG. 3 according to the up-scale 30, the processor 220 may recombine the images based on these images and finally output a second Bayer image 40 having a second resolution.

The deep learning of FIG. 4 is a diagram illustrating a method of performing deep learning in a different way from that of the deep learning of FIG. 3, and specifically, a diagram for explaining a process of generating an algorithm formed by iterative learning.

In the case of deep learning according to FIG. 4, after receiving the first sample data X and the second sample data Z having different resolutions, deep learning training may be performed based thereon.

Specifically, the deep learning according to FIG. 4 can generate an algorithm that generates an image having a higher resolution based on the parameters generated by comparing and analyzing the output data Y on which deep learning training is performed using the first sample data X as input data, and the second sample data Z.

Here, the output data Y is data outputted through actual deep learning, and the second sample data Z is data inputted by the user and may mean data that can be most ideally outputted when the first sample data X is inputted to the algorithm.

Therefore, the algorithm according to FIG. 4 compares and analyzes the most ideal second sample data Z as an output result, and the first output data Y, which is the actual output data, to derive the difference, and then feedback can be given to the algorithm in a way that offsets the differences.

Specifically, after analyzing the parameters affecting the output data, feedback is given by changing or deleting the parameters or creating new parameters so that there may be no difference between the second sample data Z, which is the ideal output data, and the first output data Y, which is the actual output data.

For example, as illustrated in FIG. 4, it is assumed that there are a total of three layers affecting the algorithm L1, L2, and L3, and there are a total of 8 parameters P11, P12, P13, P21, P22, P31, and P32 respectively in each layer.

In this case, if the difference between the first output data Y, which is the actual output data, and the second sample data Z, which is the most ideal output data, is increasing when the parameter is changed in the direction of increasing the value of the P22 parameter, the feedback may change the algorithm in the direction of decreasing the P22 parameter.

Conversely, if the difference between the first output data Y, which is the actual output data, and the second sample data Z, which is the most ideal output data, is decreasing when the parameter is changed in the direction of increasing the value of the P33 parameter, the feedback may change the algorithm in the direction of increasing the P33 parameter.

That is, through this method, the algorithm to which deep learning is applied in a way that the first output data Y, which is the actual output data, is outputted similarly to the second sample data Z, which is the most ideal output data.

And in this case, the resolution of the second sample data Z may be the same as or higher than the resolution of the first output data Y, and the resolution of the second sample data Z may be the same as the resolution of the first output data Y.

In general, in order to implement a processor capable of deep learning with a small chip, the number of deep learning processes and memory gates should be minimized, and here, the factors that have the greatest influence on the number of gates are the algorithm complexity and the amount of data processed per clock, and the amount of data processed by the processor depends on the input resolution.

Accordingly, since the processor 220 according to an embodiment creates a high-magnification image in a way that upscaling is performed after reducing the input resolution to reduce the number of gates, there is an advantage in that images can be generated faster.

For example, if an image with an input resolution of 8 MP (mega pixel) needs to be zoomed twice, it is zoomed twice by upscaling two times each in the horizontal and vertical directions based on the ¼ area (2 MP). And after ¼ downscaling of ¼ area (2 MP) and using an image with a resolution of 0.5 MP as input data for deep learning, and based on the generated image, if it is zoomed 4 times (4×) in a way that the width and length are upscaled by 4 times respectively, a zoom image of the same area that is zoomed twice can be generated.

Therefore, in the camera device 100 and the image generating method according to an embodiment, in order to prevent performance degradation due to input resolution loss, deep learning generates an image by learning as much as a magnification corresponding to the resolution loss, so there is an advantage of minimizing performance degradation.

In addition, deep learning-based algorithms for realizing high resolution images generally use a frame buffer, which may be difficult to operate in real time in general PCs and servers due to its characteristics.

However, since the processor 220 according to an embodiment applies an algorithm that has already been generated through deep learning, it can be easily applied to a low-spec camera device and various devices including the same, in applying this algorithm specifically, high resolution is realized by using only a few line buffers, so there is also an effect that a processor can be implemented with a relatively small chip.

Figure 5:
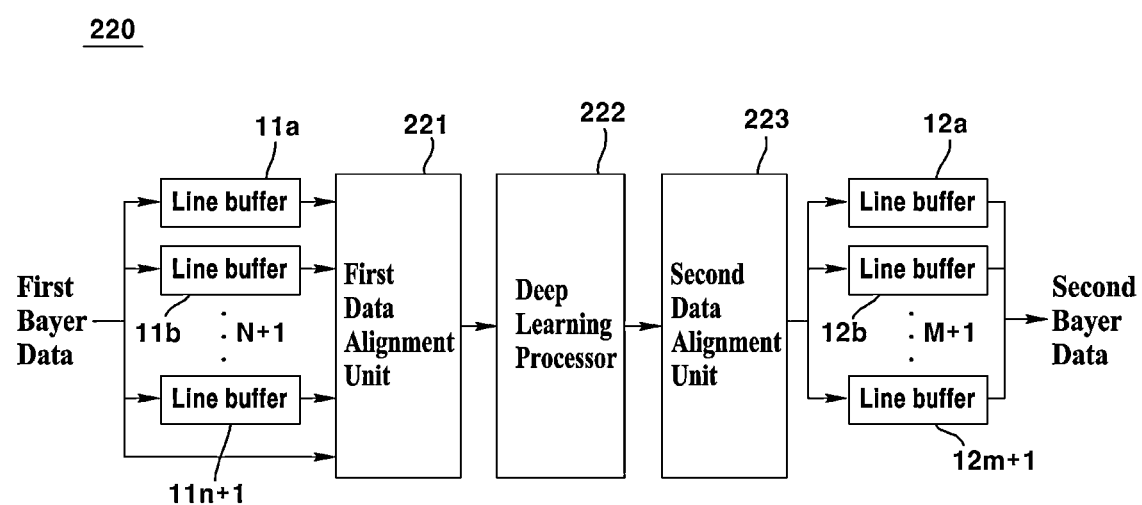
FIG. 5 is a diagram illustrating information input to a processor to which a deep learning algorithm is applied and output information being outputted through the processor.

FIG. 5 is a diagram illustrating some components of a processor 220 according to an embodiment.

Referring to FIG. 5, the processor according to an embodiment may include a plurality of line buffers 11 for receiving a first Bayer data, a first data alignment unit 221 for generating a first array data for arranging the first Bayer data outputted through the line buffer for each wavelength band, a deep learning processor 222 for performing deep learning according to a preset algorithm, and a second data alignment unit 223 for generating a second Bayer data by arranging the second array data outputted through the deep learning processor 222 in a Bayer pattern, and a plurality of line buffers 12 for outputting the second Bayer data outputted through the second data alignment unit 223.

The first Bayer data is information including the Bayer pattern previously described, and although described as Bayer data in FIG. 5, it may also be defined as a Bayer image or a Bayer pattern.

In addition, in FIG. 5, the first data alignment unit 221 and the second data aligning unit 223 are illustrated as separate components for convenience, but they are not limited thereto, and the deep learning processor 222 may perform the functions performed by the first data alignment unit 221 and the second data aligning unit 223 together.

Referring to FIG. 5, the first Bayer data having a first resolution received by the image sensor 110 Image information on an area selected by the user may be transmitted to n+1 line buffers 11a, 11b, . . . , 11n, and. 11n+1. As described previously, since the Bayer image having the second resolution is generated only for the area selected by the user, image information on the area not selected by the user is not transmitted to the line buffer 11.

Specifically, the first Bayer data includes a plurality of row data, and the plurality of row data may be transmitted to the first data alignment unit 221 through the plurality of line buffers 11.

For example, if the area where deep learning is to be performed by the deep learning processor 222 is a 3×3 area, a total of three lines must be simultaneously transmitted to the first data alignment unit 221 or the processor 220 to perform deep learning. Accordingly, information on the first line among the three lines is transmitted to the first line buffer 11a and then stored in the first line buffer 11a, and information on the second line among the three lines may be transmitted to the second line buffer 11b and then stored in the second line buffer 11b.

After that, in the case of the third line, since there is no information about the line received thereafter, it is not stored in the line buffer 11 and may be directly transmitted to the processor 220 or the first data alignment unit 221.

At this time, since the first data alignment unit 221 or the processor 220 needs to simultaneously receive information on three lines, information on the first line and information on the second line stored in the first line buffer 11a and the second line buffer 11b are also may be transmitted to the processor 220 or the first image alignment unit 219 at the same time.

Conversely, if the area where deep learning is to be performed by the deep learning processor 222 is an (N+1)×(N+1) area, Deep learning can be performed only when a total of N+1 lines are simultaneously transmitted to the first data alignment unit 221 or the processor 220. Accordingly, information on the first line among N+1 lines is transmitted to the first line buffer 11a and then stored in the first line buffer 11a, information on the second line among N+1 lines may be transmitted to the second line buffer 11b and then stored in the second line buffer 11b, and information on the Nth line among N+1 lines may be transmitted to the Nth line buffer 11n and then stored in the Nth line buffer 11n.

After that, in the case of the (N+1)th line, since there is no information on the line received thereafter, it is not stored in the line buffer 11 and can be directly transmitted to the processor 220 or the first data alignment unit 221, and as described previously, at this time, the first data alignment unit 221 or the processor 220 needs to simultaneously receive information on N+1 lines, so information on the first line to the nth line stored in the line buffers 11a to 11n may be simultaneously transmitted to the processor 220 or the first image alignment unit 219.

The first image alignment unit 219 receives Bayer data from the line buffer 11 and arranges the Bayer data for each wavelength band to generate a first array data, and then may transmit the first array data that has been generated, to the deep learning processor 222.

The first image alignment unit 219 may generate a first array data arranged by classifying the received information into specific wavelengths or specific colors of red, green, and blue.

Thereafter, the deep learning processor 222 may generate a second array data by performing deep learning based on the first array data received through the first image alignment unit 219.

Specifically, performing deep learning may mean a process of generating an algorithm through inference or iterative learning in order to generate an optimal algorithm as described previously with reference to FIGS. 3 and 4, but at the same time, executing the algorithm generated by this process can also be seen as performing deep learning.

Accordingly, the deep learning processor 222 may perform deep learning based on the first array data received through the first image alignment unit 219 to generate second array data having a second resolution higher than the first resolution.

For example, if first array data is received for the 3×3 area as described previously, deep learning is performed for the 3×3 area, and if the first array data is received for the (n+1)×(n+1) area, deep learning may be performed for the (n+1)×(n+1) area.

Thereafter, the second array data generated by the deep learning processor 222 is transmitted to the second data alignment unit 223, and the second data alignment unit 223 may convert the second array data into second Bayer data having a Bayer pattern.

After that, the converted 2nd Bayer data is outputted to the outside through a plurality of line buffers 12a, and the outputted 2nd Bayer data can be generated as an image having a second resolution higher than the first resolution by another process.

Figure 6:
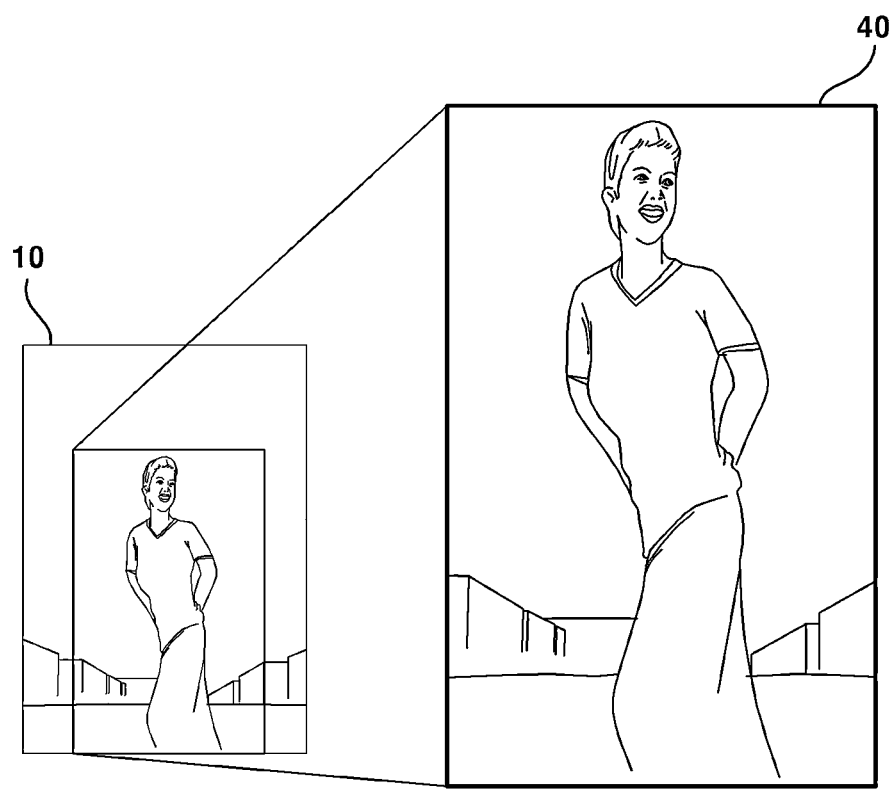
FIG. 6 is a diagram illustrating a state in which a first image having a first resolution is converted into a second image having a second resolution by a processor.

FIG. 6 is a diagram illustrating a state in which a first image having a first resolution is converted into a second image having a second resolution by a processor.

When the user selects a specific region in the image 10 having the first resolution, the processor 220 may perform the deep learning described previously for the region, and as a result of this, as illustrated in FIG. 6, a Bayer image 40 having a second resolution may be generated.

Figure 7:
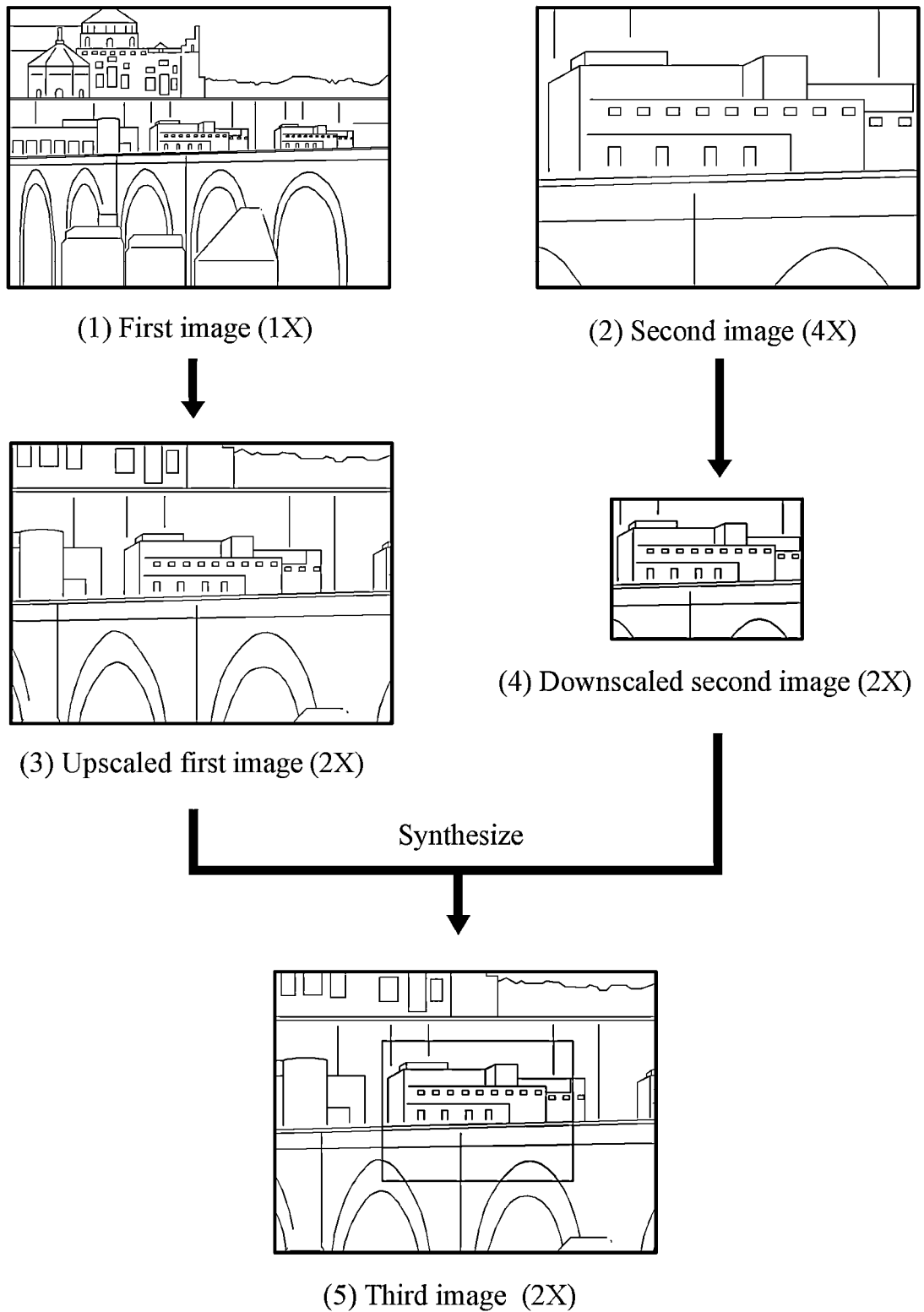
FIG. 7 is a diagram illustrating a method of generating a third image based on a first image and a second image according to an embodiment.
Figure 8:
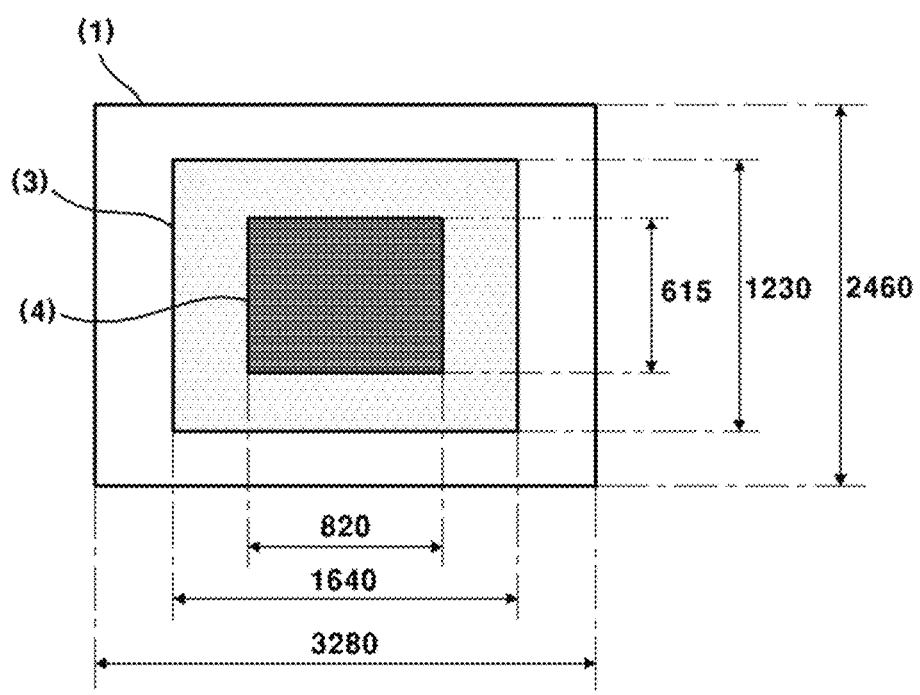
FIG. 8 is a diagram illustrating a relationship between various images according to an embodiment.

FIG. 7 is a diagram illustrating a method of generating a third image based on a first image and a second image according to an embodiment, and FIG. 8 is a diagram illustrating relationship of pixels between various images according to an embodiment.

In FIG. 7, the first image refers to an image photographed by the image sensor 110 without adjusting the magnification, and the second image refers to a generated image having a second resolution as a result of deep learning performed by the processor 220. The resolution a second image may have may vary according to a user's setting.

However, the second image having a second resolution is generated by the processor 220, and the algorithm performed by the processor 220 is an algorithm for generating an image having a specific resolution, and generally cannot be changed in real time.

For example, if the deep learning performed by the processor 220 performs an algorithm for generating a second image having a second resolution having a resolution three times higher than the first resolution, in general, a camera device can only generate an image having a resolution three times higher, but cannot generate an image having a different resolution.

Therefore, an image for magnification 3× can be generated in an optimal state, but images for other magnifications cannot be generated in an optimal state, so in this case, there is a problem in that the continuous zoom function is inevitably deteriorated.

Therefore, in the camera device 100 and the method of generating an image of the camera device according to an embodiment, even in a camera device that only supports optical continuous zoom for a specific magnification, an image for a magnification that is not supported can be generated by applying the present technology, so an object of the present invention is to provide a camera device and an image generation method of the camera device capable of effectively utilizing a continuous zoom function in a wider range of magnification.

Referring back to FIG. 7, the camera device 110 according to an embodiment generates a first image having a first resolution photographed by the image sensor 110 without adjusting a magnification and a second image having a second resolution generated as a result of deep learning. For convenience of explanation, the first image is referred to as magnification 1× without magnification, the second image is referred to as an image having magnification 4×, and it is assumed that the second resolution is 4 times higher than the first resolution.

After that, if the desired magnification of a user is a 2× image, the first image is magnified by 2× and then upscaling is performed. That is, since the difference in magnification is 2×, an image with upscaling corresponding to 2× is generated.

On the other hand, since the magnification of the second image is 4 times and the resolution is also 4 times, downscaling is performed to match magnification 2×. That is, since the difference in magnification is 2 times, an image that has been down-scaled by ½ times is generated.

As the pixels of the two images become the same according to this process, a third image is generated by synthesizing the two images as illustrated in FIG. 7. Specifically, since the user is interested in the central part, the third image can be generated by superimposing the second image to the center of the up-scaled first image.

That is, FIG. 8 is a view illustrating three images (a first image (1), an up-scaled first image (3), and a down-scaled second image (4)) in FIG. 7 together, (1) in FIG. 7 is the same as (1) in FIG. 8, (3) in FIG. 7 is the same as (3) in FIG. 8, and (4) in FIG. 7 is the same as (4) in FIG. 8. Numerical figures in the drawings mean the number of pixels.

In the case of synthesizing the third image according to a camera device 100 and an image generation method of the camera device, since high-resolution images are used for synthesizing the parts of user's interest, there is an advantage in that it is possible to generate images at various magnifications without any special sense of heterogeneity.

Figure 9:
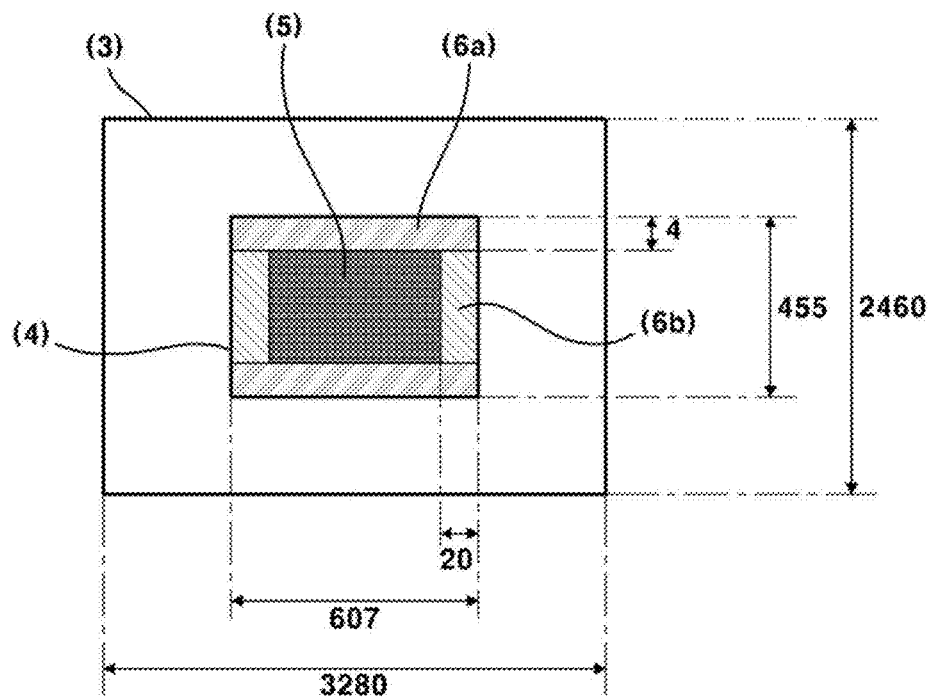
FIG. 9 is a diagram illustrating a method of correction process for a boundary line of a third image according to an embodiment.

FIG. 9 is a diagram illustrating a method of correction process for a boundary line of a third image according to an embodiment.

According to FIG. 8, when a third image is generated, images for continuous magnification can efficiently generated, but in the case of a region where the first image and the second image meet, the resolution is different, and thus a sense of heterogeneity may occur. That is, as illustrated in FIG. 9, in the case of region (6a) or region (6b), a problem in which an image is not natural may occur due to the difference in resolution.

Accordingly, the camera device 100 according to an embodiment may generate a more natural image without a sense of heterogeneity by performing a resolution correction process on a boundary region, that is, a preset range.

Looking at this in detail, in the case of area (6a) in FIG. 9, since it is a second image area in principle, it is an area having a second resolution, and corresponds to an area in which a sense of heterogeneity with the surrounding area is most likely to occur. Therefore, resolution correction can be performed on this part, and specifically, the resolution correction may be performed by changing the mixing ratio of the first resolution and the second resolution.

That is, when the ratio of the first resolution and the second resolution is mixed in the boundary regions (6a) and (6b), the generated resolution has a resolution value between the first resolution and the second resolution, and thus there is no abrupt difference in resolution between the two images, thereby reducing the sense of heterogeneity.

In addition, based on (6a), the ratio of the first resolution is raised to be higher than the ratio of the second resolution in the region near the first resolution, and the correction for the region near the second resolution can be performed in a way that the ratio of the second resolution is raised to be higher than the ratio of the first resolution.

That is, the correction may be performed in a way that the uppermost portion of (6a) has the highest first resolution ratio, and then decreases the first resolution ratio and increases the second resolution ratio as it travels downward. In this case, since the value of the resolution is gradually changed, more natural correction can be performed.

In addition, in FIG. 9, the area (6a) is indicated as a horizontal area, because general image processing is performed based on a horizontal line.

In addition, the range of (6a) is a preset range, which can be freely set by a user, and may be determined according to the number of line buffers. That is, when the number of line buffers is 4, correction may be performed based on 4 pixels as illustrated in FIG. 9, and when the number of line buffers is 8, correction may be performed based on 8 pixels. That is, the ranges (6a) and (6b) may be designated as various ranges according to the use environment and the purpose of the user.

Up to now, a camera device 100 and an image generation method of the camera device have been described through the drawings.

In the case of digital zoom according to the prior art, since an image is generated by simply magnifying a portion of a less magnified image, as the magnification increases, the practical number of pixels decreases, leading to performance degradation. Since zoom using the optical system of a small camera is also not a method of continuously moving a lens, there is a problem that an image cannot be generated using a lens other than a specifically fixed magnification.

In a camera device and an image generation method of the camera device according to an embodiment, since a high-resolution image is implemented by using a processor to which an algorithm capable of generating a high-resolution image is applied, there is an advantage in that a high resolution image can be implemented by using only a few line buffers.

In addition, even in a camera device that only support optically continuous zoom for a specific magnification, images for unsupported magnifications can be generated by applying this technology, so there is an effect in that a practically continuous zoom function in a wider range of magnification can be utilized.

Although the embodiments so far have been described with reference to the limited embodiments and drawings, various modifications and variations are possible from the above description by those skilled in the art. For example, appropriate results can be achieved if the described techniques are performed in a different order from the described method, and/or components of the described systems, structures, devices, circuits, and the like are combined or combined in a manner different from the described method, or even if substituted or substituted by other components or equivalents. Therefore, other embodiments and equivalents to the claims also fall within the scope of the claims to be described later.

The invention claimed is:

1. A camera device comprising:
an input unit configured to receive a magnification from a user;
an image sensor configured to receive light and generate a first image having a first resolution; and
a processor configured to:
apply a preset algorithm to the first image captured by the image sensor to generate a second image having a second resolution higher than the first resolution of the first image, and
generate a third image having a third resolution corresponding to the magnification from the user based on the first image having the first resolution and the second image having the second resolution,
wherein the first resolution, the second resolution and the third resolution are different from each other.

2. The camera device according to claim 1, wherein the processor is a processor being learned using a deep learning.

3. The camera device according to claim 1, wherein the processor generates the third image by superimposing the second image on the first image enlarged by the magnification input by the user.

4. The camera device according to claim 1, wherein the third resolution is between the first resolution and the second resolution.

5. The camera device according to claim 1, wherein the processor generates the third image after up-scaling the first image using the magnification input by the user and down-scaling the second image using the magnification input by the user.

6. The camera device according to claim 1, wherein the processor generates the third image after superimposing the second image to a center of the first image.

7. The camera device according to claim 1, wherein the processor performs correction of the third resolution by a preset range based on a boundary region where the first image and the second image are being superimposed with each other.

8. The camera device according to claim 7, wherein the processor performs correction of the third resolution by changing a mixing ratio of the first resolution and the second resolution.

9. The camera device according to claim 8, wherein the processor adjusts the mixing ratio to decrease an amount of the first resolution and increase an amount of the second resolution from an outer edge of the boundary region to an inner edge of the boundary region,
wherein the inner edge of the boundary region is closer to a center of the third image than the outer edge of the boundary region.

10. A method of controlling a camera device, the method comprising:
receiving a magnification from a user;
receiving light by using an image sensor and generating a first image having a first resolution;
applying, by a processor in the camera device, a preset algorithm to the first image captured by the image sensor to generate a second image having a second resolution higher than the first resolution of the first image; and
generating, by the processor, a third image having a third resolution corresponding to the magnification from the user based on the first image having the first resolution and the second image having the second resolution,
wherein the first resolution, the second resolution and the third resolution are different from each other.

11. The method according to claim 10, wherein the processor is a processor being learned using a deep learning.

12. The method according to claim 10, wherein the third image is generated by superimposing the second image on the first image enlarged by the magnification input by the user.

13. The method according to claim 10, wherein the third resolution is between the first resolution and the second resolution.

14. The method according to claim 10, wherein the third image is generated after up-scaling the first image using the magnification input by the user and down-scaling the second image using the magnification input by the user.

15. The method according to claim 10, wherein the third image is generated after superimposing the second image to a center of the first image.

16. The method according to claim 10, further comprising correcting the third resolution by a preset range based on a boundary region where the first image and the second image are being superimposed with each other.

17. The method according to claim 16, wherein the correcting the third resolution is performed by changing a mixing ratio of the first resolution and the second resolution.

18. The method according to claim 17, wherein the changing the mixing ratio includes adjusting the mixing ratio to decrease an amount of the first resolution and increase an amount of the second resolution from an outer edge of the boundary region to an inner edge of the boundary region, and
wherein the inner edge of the boundary region is closer to a center of the third image than the outer edge of the boundary region.

* * * * *